Patented Dec. 3, 1929

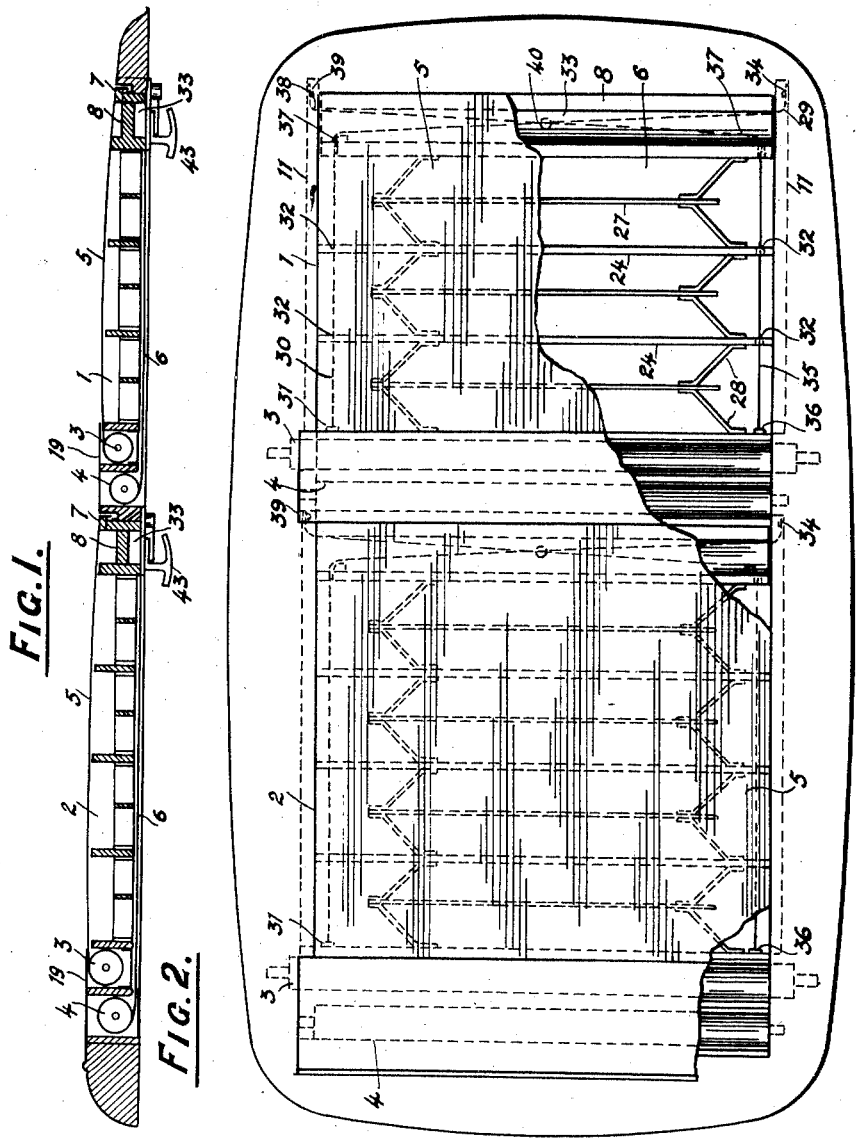

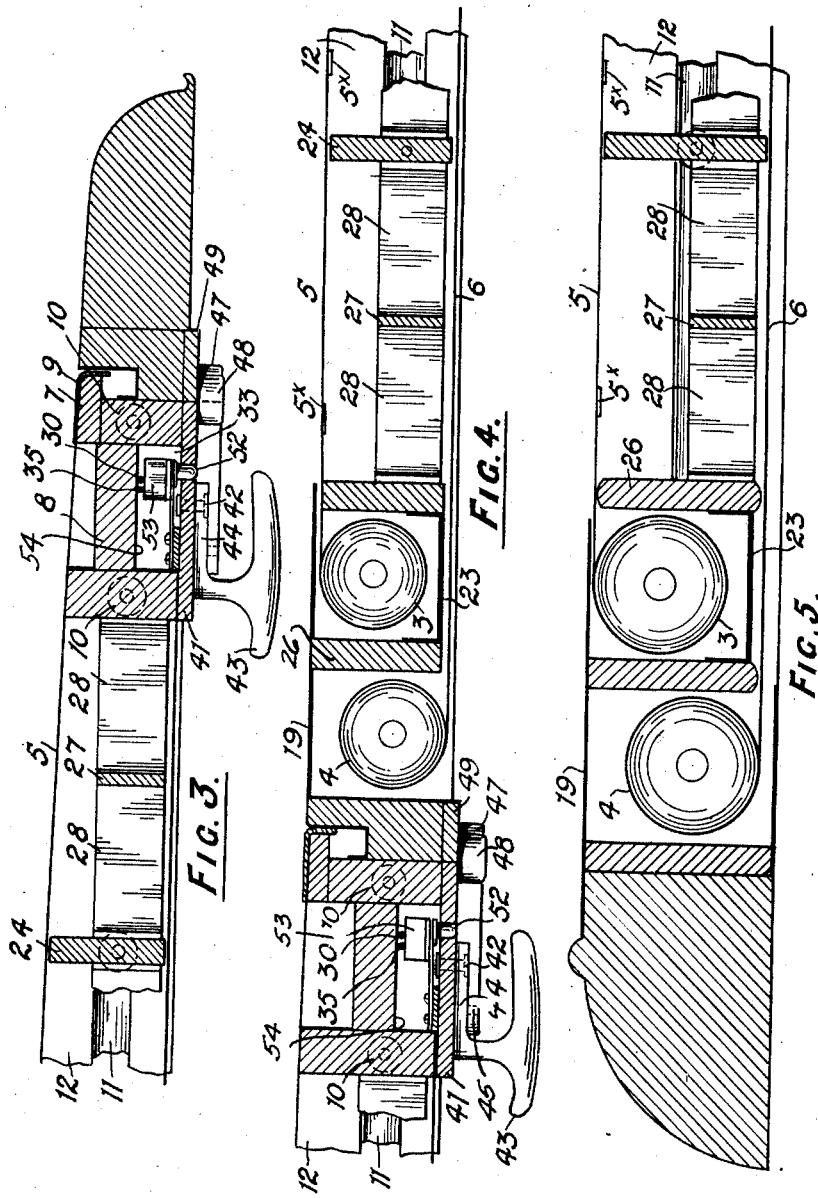

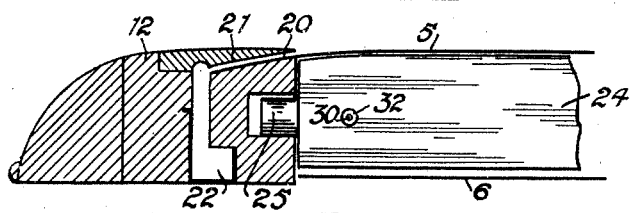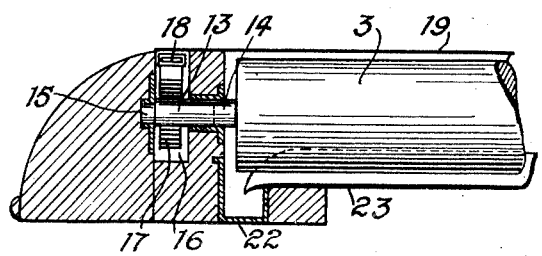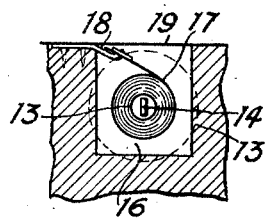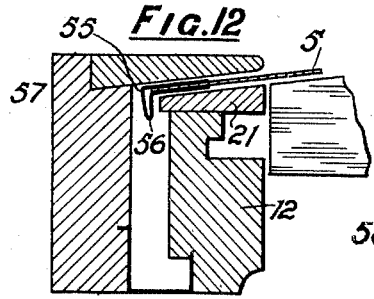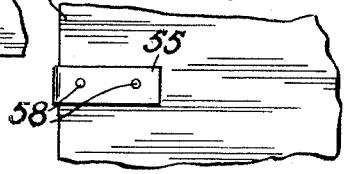

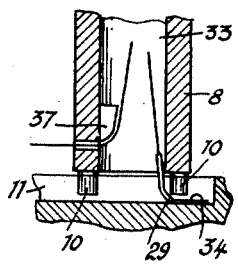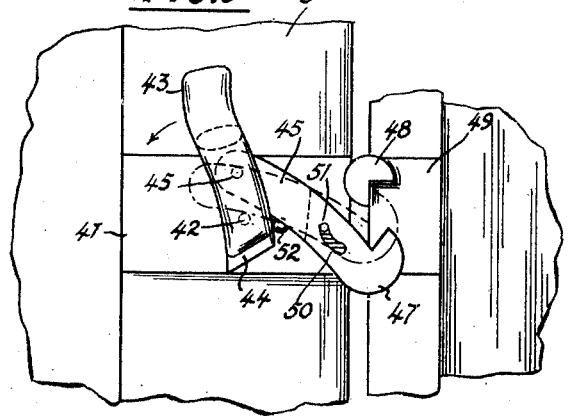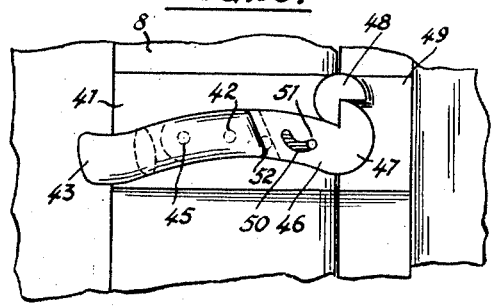

1,738,060

UNITED STATES PATENT OFFICE

HORATIO NELSON BARNES, OF LONDON, ENGLAND

ROOF OF MOTOR CARS AND LIKE VEHICLES OF THE INCLOSED OR SALOON TYPE

Application filed November 15, 1928, Serial No. 319,478, and in Great Britain November 7, 1927.

This invention relates to roofs of motor cars and like vehicles of the inclosed or saloon type, and more particularly to improved means for readily converting a closed car of the above type into an open car or vice versa.

There are various known means for converting the saloon type of car from an open to a closed car and vice versa, but such means as heretofore constructed are open to various objections, for example, in one form the front half of the roof is made in one solid piece and slides back on to the top of or into the back fixed portion. In this case the roof over the rear passengers is always closed and therefore the convenience of front and back passengers cannot be provided for independently. Other known types comprise hoods or covers which wind or fold or are in other ways collapsible, but these also make no provision for the convenience of front and back passengers independently.

Roller blinds or shutters similar to the roll-top desk have also been proposed, but it has been found impossible to make covers of this type weather-proof, moreover, they also have the disadvantage of being flat on top, instead of cambered, besides being of complicated construction.

When fabric alone has been used for the cover, then the hood has either had no transverse ribs to support it, or the ribs have been permanently fixed across the car, which is very unsightly.

It has been found that the most perfect type of hood or cover is one which opens in one, two or more parts and that can be independently and variably adjustable by the occupants of each row of seats respectively. In hot weather, this allows any one of them to open as much of the roof as desired leaving the remaining portion to form a sunshade.

At varying speeds of the car, the wind and consequent draughts have also varying effects. With a hood which must be entirely open or closed, there is no protection from the wind for passengers in the rear seats, when open, also vacuum is caused by the wind passing over the top of the front screen, which directly affects the passengers in the front seats. With a hood or cover constructed according to this invention, this vacuum may be obviated, many of the defects above set forth remedied and the hood can be regulated to suit various wind conditions and affords a convenient and economical construction.

According to this invention the roof of a motor car of the inclosed or saloon type is preferably formed with two rectangular openings, thus dividing the roof into two sections and each section is provided with closure means of flexible material mounted on spring rollers, two rollers being provided to each section. The material which is to form the top surface of the closure means is made of weatherproof fabric and is mounted upon one roller and the other roller has mounted upon it a cloth lining, which is to form the usual finish to the inside of the car.

The two fabrics are fixed to the spring rollers in any convenient manner and the front edge of the fabrics are secured to a front lath which preferably runs on roller bearings in a groove in the cant-rail of the car and means are provided for adjusting the tension of the springs in the rollers.

Provision is made for effectively draining the surface water at the side edges of the hood or closure means, by suitably arranged channels and draining openings to prevent any leakage of water into the interior of the car.

Between the front lath and the spring rollers there are a series of transverse ribs or hoop-sticks which travel backwards and forwards in grooves in the cant-rail as the hood is closed or extended, such ribs being preferably also provided with anti-friction rollers. The ribs are also connected to the front lath and each other, in such a manner that as the front lath is drawn forward the ribs will be drawn in spaced and equidistant parallel positions to support the fabric between the front lath and the rollers by means, comprising hinged wooden strips or lazy-tongs connections, but they are not otherwise connected to the waterproof cover. The ribs may be provided with a metal loop or similar means for supporting the lining in the interior of the car, or small ribs may be stitched in the material of the lining for the same purpose.

The ribs are preferably slightly cambered on the top edge giving the waterproof fabric the necessary camber at the top when extended; this camber follows the lines of existing fixed hoods and serves to assist the water to drain off the roof.

Means are provided for keeping the front lath in a parallel position with respect to the spring rollers at all times, by means of a system of fixed wires, cords or the like passing over grooved wheels or other anti-friction devices on the front lath.

This system consists in providing the front lath with two grooved wheels or anti-friction devices at each end and taking a cord or wire from a fixed point at the rear left hand side of the car round a wheel or anti-friction device at the left hand end of the lath, then along the lath round a wheel or anti-friction device at the right hand end and thence to a fixed point at the front right hand side of the car. A similar cord or wire is taken from a fixed point at the right hand side at the rear of the car, round a wheel or anti-friction device at the right hand end of the lath, then along the lath round a wheel or anti-friction device at the left hand end to a fixed point at the front left hand side of the car, the two cords or wires crossing at approximately the centre of the lath, and means are provided for gripping the wires or cords to the lath for holding the lath in the closed or any desired intermediate position, if required.

It has been found that with this arrangement of cords or wires, upon any movement of the front lath either forwards or backwards, it will always remain parallel with the rollers to the extreme limits of its movement.

Further, means are also provided for holding the hood in its completely closed position and such means comprise a suitable hook or catch that can be operated by one movement when opening or closing the hood by hand and this means is preferably combined with the means above mentioned for gripping the wires or cords and holding the front lath and securing the hood in a partly extended position.

In order to enable the invention to be clearly understood an example of construction of a roof for a motor car or the like vehicle will be described with reference to the accompanying drawings in which—

Fig. 1 is a diagrammatical longitudinal section of the roof of a motor car fitted with the closure means according to this invention.

Fig. 2 is a plan view of the roof shown in Fig. 1 with parts broken away to more clearly show the construction and arrangement of parts.

Fig. 3 is a longitudinal section of the front part of the hood shown in Fig. 1 drawn to a larger scale.

Fig. 4 is a similar view of the centre portion of the hood.

Fig. 5 is a similar view of the rear portion of the hood.

Fig. 6 is a transverse section of a portion of one side of the hood showing the method employed for rendering the side edges of the flexible closure means weatherproof.

Fig. 7 is a transverse section of a portion of one side of the hood showing the method of mounting the spring rollers and the means for adjusting the tension of the spring therein.

Fig. 8 is a cross sectional view of Fig. 7.

Figs. 9 and 10 are underneath plan views of the locking and clamping fastener for securing the hood in its closed, partly open or fully open positions, and Fig. 11 is a detail sectional view of the anti-frictional devices on the end of the front lath.

Fig. 12 is a detail sectional view of a method of securing the edges of the cover in its guiding slots, and Fig. 13 is a plan view of a securing clip attached to one edge of the cover.

Referring to these drawings, the roof of a motor car is formed with two rectangular openings, thus dividing the roof into two sections 1 and 2. As each of these sections will be fitted with a similar closure means, it will only be necessary to describe the construction and arrangement of parts in connection with, for example, the section 1, covering the front portion of the car.

At the rear of this section 1 are mounted two spring controlled rollers 3 and 4 of ordinary construction, the roller 3 having mounted thereon, in any convenient manner, a blind or cover 5 of weatherproof fabric and the roller 4 having mounted thereon suitable cloth fabric 6 to form a lining to the interior of the roof of car. The two rollers are mounted parallel and adjacent to one another, the material 5 forming the cover being arranged to unroll from the upper surface of the roller 3 while the material 6 forming the lining is arranged to unroll from the under surface of the roller 4. The front edge 7 of the material 5 is secured to the top surface of a front lath 8 preferably by means of a metal strip 9 as shown in Fig. 3. The front lath 8 preferably runs on roller bearings 10 in a groove 11 in the cant-rail 12 of the car.

Means are provided for adjusting the tension of the springs in the rollers 3 and 4 and such means comprise a spindle 13 mounted upon the usual flattened part 14 of the spring roller. See Figs. 7 and 8. This spindle 13 runs in bearings 15 and bridges a recess 16 cut in the body of the car. Upon the spindle 13, within the recess 16, a leather or other flexible band 17 is wound in such a manner that upon pulling the end of the flexible band 17 and unwinding the same from the spindle 13 a more or less variable tension may be applied to the spring contained within the roller, and when the desired adjustment of the tension has been made the end of the flexible band 17 may be secured to a buckle 18 or other fastening means within the recess 16. The recess 16 will be closed by the covering plate 19 provided for inclosing the rollers 3 and 4.

The side edges 20 of the cover 5, run in longitudinal grooves 21 in the cant-rail 12 and preferably slope downwards towards their outer edge as shown in Fig. 6, with the object of allowing the surface water to drain into the water channel 22 having outlets at each end of the car. A trough 23 is also provided underneath the roller 3 of the cover 5, and this trough also drains into the channels 22 above mentioned as shown in Fig. 7. This method of draining the surface water effectually prevents any danger of leakage of water into the interior of the car.

The cover 5 is supported between the front lath 8 and the spring roller 3 by means of a series of transverse ribs or hoop-sticks 24, which are preferably provided with antifriction rollers 25 and travel backwards and forwards in the grooves 11 in the cant-rail 12 as the hood is closed or extended. The ribs 24 are connected to the front lath 8, the spring roller box 26 and to each other by means of a series of parallel strips 27 and a plurality of hinged wooden connecting pieces 28, so arranged that they will cause each hoop-stick 24 to be consecutively separated or collapsed, parallel with the front lath 8 when the hood is being closed or opened. The hoop-sticks 24 and parallel strips 27 are not otherwise connected to the cover 5 and serve merely as a support to the cover 5 to prevent the same sagging downwards when fully extended.

In order to prevent the cover 5 when closed from being drawn from its position in the grooves 21 by the suction caused on the upper surface of the cover 5 by the action of the air when the car is travelling at any speed, the cover 5 is strengthened or stiffened by securing thereto, such as by cementing or stitching, for example, narrow thin strips of metal 5×, at suitable distances apart, transversely across the underside of the cover 5, as indicated in Figs. 4 and 5, which strips will effectually prevent any tendency of the cover 5 from bellying upwards by suction but will not prevent the cover 5 from closely rolling around its roller 3 when being opened. The said strips 5× will preferably be of such a length as to extend from side to side the full width of the cover 5 with the exception of that part of the cover which travels in the grooves 21.

The lining 6, the front edge of which is fixed to the lower surface of the front lath 8, is usually at sufficient tension, not to need support in the interior of the car, but may, if desired, be supported by means of a transverse metal bar or rod carried by the hoop-sticks or by small ribs or stiffeners being stitched in the material of the lining.

In some cases for a like purpose to that just described, it may be preferable to affix at intervals along the edges of the cover 5, metal clips 55 of the kind shown at Figs. 12 and 13 and these metal clips 55 may be formed of thin metal strips bent to engage the upper and lower surfaces of the cover 5, as shown at 56 and to protrude slightly beyond the edge thereof, the protruding end of the clips 55 being bent angularly and downwardly as shown at 57 so as to overlap the side of the groove 21 in the cant rail 12 and thus prevent the edges of the cover 5 from being drawn out of position in groove 21. It will only be necessary to provide two or three clips 55, on each side edge of the cover 5 and they will be secured thereto in any suitable manner, such as by rivets 58, cementing, sawing or other like means. The arrangement will effectually prevent any tendency of the edges of the cover 5 from being drawn from its normal position within the groove 21 in the cant rail 12 and also will not interfere with the material of the cover 5 from closely rolling around its roller 3 when the top is being opened.

The lining 6, the front edge of which is fixed to the lower surface of the front lath 8, is usually at sufficient tension, not to need support in the interior of the car, but may, if desired, be supported by means of a transverse metal bar or rod carried by the hoop-sticks or by small ribs or stiffeners being stitched in the material of the lining.

The ribs or hoop-sticks are as stated above, cambered on the upper surface so as to effectually drain the water to the edges of the roof and into the channels 22 as above explained and also to give a finished and symmetrical appearance to the car.

As it is intended to manually operate this sliding roof, means are provided for ensuring that the front lath shall always travel parallel to the spring-rollers upon which the covering means are wound, and this parallel movement is assured by the following system.

This system consists in mounting upon the front lath 8 at each end thereof two anti-friction devices, which may be grooved wheels or as shown in Fig. 11, may consist of a shaped block of wood or the like 37 and a short length of bent tube 29. A cord, wire or like flexible connection 30 is secured to a point 31 at the rear left hand side of the car, passes between the upper and lower surfaces 5 and 6 of the hood and through apertures 32 in each of the hoop-sticks 24, around the friction device 37 through the passageway 33 in the front lath 8 and thence through the bent, tubular friction device 29 at the opposite end of the lath 8 to fixed point 34 at the front right hand side of the car. A similar cord, wire or the like flexible connection 35 is taken from a fixed point 36 through apertures 32 in the hoop-sticks 24 around friction device 37 through the tubular friction device 38 at the other end of the lath 8 to a fixed point 39 at the front left hand side of the car. It will be seen that the two wires or cords pass in opposite directions along the passage-way 33 of the front lath 8 and will cross at a point 40 approximately midway between each end of the lath 8.

It will be noted that by mounting the front lath as above described any movement thereof, for the purpose of opening or closing the hood will effectively maintain the said lath always parallel with the spring-rollers, the cords or wires to the rear of the lath will always be hidden between the outer cover 5 and the lining 6 and the cords or wires in front of the lath will by means of the bent tubes 29, 38, be laid concealed within the grooves 11 in the cant-rail 12.

As the tendency of the sliding hood constructed as above described will always be to remain normally open owing to the action of the spring-rollers, means are provided for locking and clamping the front lath close up against the front fixed portion of the car and also for locking the hood in any intermediate or the fully opened position. This locking means which is fitted to each movable section of the car is constructed and operated as follows:—Upon a base plate 41 attached to the underside of the front lath 8 (see Figs. 9 and 10) is pivotally mounted at 42 the operating handle 43 formed with a horizontally moving member 44. Upon the horizontally moving member 44 is pivotally mounted at 45 a horizontally moving lever 46 having a hooked-end 47 for engagement with the shaped projection 48 carried by a base plate 49 secured in a suitable position on a fixed part of the car. The lever 46 has a curved slot 50 in engagement with a pin 51 carried by the base plate 41. In the path of movement of the member 44, the base plate 41 is perforated for the insertion of a projecting stud 52, and this stud 52 engages with a spring controlled brake-block 53 (see Figs. 3 and 4) which is placed in such a position that upon pressure being applied to the stud 52 it will clamp the cords or wires 30, 35, against the surface 54 of the front lath 8. By this means upon turning the operating handle 43 in the direction of the arrow shown in Fig. 9, into the position shown in Fig. 10, the member 44 will press the stud 52 upwards and thus clamp the cords or wires 30, 35, tightly against the surface 54 of the front lath 8 and will thus lock the lath 8 in any desired intermediate position in which it may be placed. The brake-block 53 is preferably formed of some resilient material such as rubber, leather or the like.

For securing the hood in its completely closed position the operating handle 43 is turned in the direction of the arrow shown in Fig. 9. The hooked-end 47 of the lever 46 will first engage the shaped projection 48 as indicated by the dotted lines in Fig. 9, and upon a further turning movement of the handle 43 will draw the front edge of the lath 8 into close contact with the fixed part of the car and be securely locked thereto, at the same time clamping the cords or wires 30, 35, to the surface 54 on the front lath by means of the stud 52 and brake-block 53 as indicated in Figs. 10, 3 and 4.

In the roof for motor cars and like vehicles constructed as above described and according to this invention, the inside and outside of the roof have exactly the same appearance as that of the ordinary permanently fixed roof, whether the hood is open to its fullest extent or only partly open, and there are no pendent folds of cloth either in the outside covering or in the inner lining.

With a hood constructed as above described, opening the hood just a few inches has the effect of drawing straight up the hot air and fumes of the engine, the quick passage of the air along the top of the car and across the opening effecting this result.

Further, it is found that with the hood open a few inches for ventilation, moderate rain does not pass into the car, but is carried by the wind over the aperture even when travelling at quite a moderate speed.

I claim:—

1. A roof for motor cars and other vehicles of the type herein described, embodying therein cant rails, rigid members extending between said cant rails in spaced relation to each other, forming an opening through the roof structure, closure means comprising an outer flexible strip of weatherproof fabric, an inner lining strip of flexible fabric below said weatherproof strip, spring actuated rollers in one of said rigid members co-operating with said fabric strips respectively, a slidably mounted rigid member between said cant rails in parallel relation with said rollers and having one end of each of said flexible strips connected therewith, and means whereby said rigid member may be locked against movement.

2. A roof for motor cars and other vehicles of the type herein described, embodying therein cant rails, rigid members extending between said cant rails in spaced relation to each other, forming an opening through the roof structure, closure means comprising an outer flexible strip of weatherproof fabric, an inner lining strip of flexible fabric below said weatherproof strip, spring actuated rollers in one of said rigid members co-operating with said fabric strips respectively, a slidably mounted rigid member between said cant rails in parallel relation with said rollers and having one end of each of said flexible strips connected therewith, hoops positioned between said fabric strips and slidably mounted in said cant rails in supporting relation to said outer weatherproof fabric strip, and means whereby said rigid member may be locked against movement when the closure means is fully open, fully closed or partially open.

3. A roof for motor cars and like vehicles of the type herein described, embodying therein cant rails having longitudinally extending grooves therein, rigid members extending between said cant rails in spaced relation to each other forming an opening through the roof structure, closure means comprising an outer flexible strip of weatherproof fabric, the edges of which enter the grooves in said cant rails, channel forming means in each cant rail below the edges of said closure means, stiffening means carried by said closure means intermediate said cant rails, means retaining the edges of said closure means in said grooves, an inner lining strip of flexible fabric below said weatherproof strip, spring actuated rollers in one of said rigid members co-operating with said fabric strips respectively, a slidably mounted rigid member between said cant rails in parallel relation with said rollers and having one end of each of said flexible strips connected therewith, hoops positioned between said fabric strips and slidably mounted in said cant rails in supporting relation to said outer weatherproof fabric strip, and means whereby said rigid member may be locked against movement when the closure means is fully open, fully closed or partially open.

HORATIO NELSON BARNES.